(12) United States Patent
Cho et al.

(10) Patent No.: US 8,725,976 B2
(45) Date of Patent: May 13, 2014

(54) METHOD OF OPTIMIZING DATA TRAINING IN SYSTEM INCLUDING MEMORY DEVICES

(75) Inventors: Beom-Sig Cho, Hwaseong-si (KR); Jang-Seok Choi, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 702 days.

(21) Appl. No.: 12/983,509

(22) Filed: Jan. 3, 2011

(65) Prior Publication Data

US 2011/0218949 A1 Sep. 8, 2011

(30) Foreign Application Priority Data

Mar. 4, 2010 (KR) .................. 10-2010-0019485

(51) Int. Cl.
*G06F 12/00* (2006.01)
*G06F 11/22* (2006.01)

(52) U.S. Cl.
USPC ............ 711/167; 711/105; 714/700; 714/719

(58) Field of Classification Search
None
See application file for complete search history.

(56) References Cited

U.S. PATENT DOCUMENTS

| 7,558,979 | B2 | 7/2009 | Song et al. | |
|---|---|---|---|---|
| 8,081,527 | B1 * | 12/2011 | Venkataraman et al. | ..... 365/194 |
| 8,386,722 | B1 * | 2/2013 | Wang et al. | .................. 711/154 |
| 2006/0062286 | A1 | 3/2006 | Park et al. | |
| 2007/0079049 | A1 * | 4/2007 | LaBerge | ......................... 711/5 |
| 2009/0119419 | A1 | 5/2009 | Bae et al. | |
| 2009/0245010 | A1 * | 10/2009 | Searles et al. | ............ 365/230.06 |
| 2011/0320867 | A1 * | 12/2011 | Chaudhuri et al. | ............. 714/15 |

FOREIGN PATENT DOCUMENTS

| JP | 2009-117025 | 5/2009 |
|---|---|---|
| KR | 10-0594294 | 3/2006 |
| KR | 10-0618870 | 4/2006 |
| KR | 10-0903367 | 5/2009 |

* cited by examiner

*Primary Examiner* — Gary Portka
(74) *Attorney, Agent, or Firm* — Muir Patent Consulting, PLLC

(57) ABSTRACT

In one embodiment, a method of performing data training in a system including a memory controller and at least a first memory device including a group of memory banks is disclosed. The method includes providing a plurality of enabling states for the group of memory banks, wherein each enabling state is different and for each enabling state a set of the memory banks of the group is enabled and any remaining of the memory banks of the group are not enabled. The method further includes performing a first data training procedure that includes a series of first data training operations for the first memory device, each data training operation being performed for a different one of the plurality of enabling states, generating a noise profile based on the series of first data training operations, statistically analyzing the noise profile to select a reference enabling state of the group of memory banks, and performing a second data training procedure for the first memory device using the reference enabling state. As a result, the operating speed and reliability of the system including the memory device may be improved.

16 Claims, 8 Drawing Sheets

METHOD OF OPTIMIZING DATA TRAINING IN SYSTEM INCLUDING MEMORY DEVICES

CROSS-REFERENCE TO RELATED APPLICATION

This application claims priority under 35 U.S.C. §119 to Korean Patent Application No. 10-2010-0019485 filed on Mar. 4, 2010, the disclosure of which is hereby incorporated by reference in its entirety.

BACKGROUND

1. Field

The disclosed embodiments relate to a method of optimizing data training and, more particularly, to a method of optimizing data training in a system including memory devices.

2. Description of Related Art

Rapid increases in the capacity and operating speed of memory devices have led to increases in skews due to differences in transmission rate between data and clock signals. Here, the term "skew" refers to a phase difference between a clock signal and the data.

In general, a memory device may employ a data training method as a clock data recovery (CDR) method to remove a skew between data and a clock signal. Data training methods may be classified into a per-pin data training method and a byte data training method. The per-pin data training method may include compensating a skew between a clock signal and each of a plurality of data transmitted in parallel. The byte data training method may include selecting one from a plurality of data transmitted in parallel, compensating a skew between a clock signal and the selected data, and applying a compensation result to all the remaining data.

Either of the per-pin data training method and the byte data training method may be categorized as a write data training method or a read data training method. In the write data training method, a memory controller may generate training data having a data training pattern and transmit the training data to a memory device to perform data training. The pattern may be compared to a predetermined pattern to determine if errors exist and to determine a data skew. An exemplary data training method is described in U.S. Patent Application Publication No. 2006/0062286, published on Mar. 23, 2006, and incorporated herein by reference in its entirety. In the read data training method, training data stored in a training register of a memory device may be transmitted to a memory controller to perform data training. However, the read training method may be performed using training data stored in a training register, while the write training method may be performed using training data generated by a memory controller. As a result, both the read data training operation and the write data training operation may be performed irrespective of enabling states of a plurality of banks included in the memory device. Thus, a conventional data training method may be performed when the plurality of banks included in the memory device are disabled.

Accordingly, in the conventional data training method, data training may be performed without consideration of a core noise caused in the memory device, and a skew between a clock signal and data may be controlled based on the data training result. However, as the operating speed of the memory device further increases, the influence of the core noise of the memory device cannot be ignored.

SUMMARY

The disclosed embodiments provide a method of optimizing data training in a system including memory devices.

In one embodiment, a method of performing data training in a system including a memory controller and at least a first memory device including a group of memory banks is disclosed. The method includes providing a plurality of enabling states for the group of memory banks, wherein each enabling state is different and for each enabling state a set of the memory banks of the group is enabled and any remaining of the memory banks of the group are not enabled; performing a first data training procedure that includes a series of first data training operations for the first memory device, each data training operation being performed for a different one of the plurality of enabling states; generating a noise profile based on the series of first data training operations; statistically analyzing the noise profile to select a reference enabling state of the group of memory banks; and performing a second data training procedure for the first memory device using the reference enabling state.

In another embodiment, a system comprises at least a first memory device including a group of memory units, and a memory controller including a training controller. The training controller is configured to provide a plurality of enabling states for the group of memory units, wherein each enabling state is different and for each enabling state a set of the memory units of the group is enabled and any remaining of the memory units of the group are not enabled. The training controller is further configured to perform a first data training procedure including a series of first data training operations for the first memory device, each data training operation being performed for a different one of the plurality of enabling states. The training controller is additionally configured to generate a noise profile based on the series of first data training operations, and statistically analyze the noise profile to select a reference enabling state of the group of memory units. The training controller may then perform a second data training procedure for the first memory device using the reference enabling state.

In a further embodiment, a method of performing data training in a system including a memory controller and at least a first storage device including a group of memory units is disclosed. The method comprises providing a plurality of enabling states for the group of memory units, wherein each enabling state is different and for each enabling state a set of the memory units of the group is enabled and any remaining of the memory units of the group are not enabled; performing a first data training procedure that includes a series of first data training operations for the first storage device, each data training operation being performed for a different one of the plurality of enabling states; generating a noise profile based on the series of first data training operations; and using the noise profile to compensate for skew in the storage device.

BRIEF DESCRIPTION OF THE DRAWINGS

The foregoing and other features and advantages described herein will be apparent from the more particular description of preferred embodiments, as illustrated in the accompanying drawings in which like reference characters refer to like parts throughout the different views. The drawings are not necessarily to scale, emphasis instead being placed upon illustrating the principles of the disclosed embodiments. In the drawings.

DETAILED DESCRIPTION

Figure 1:
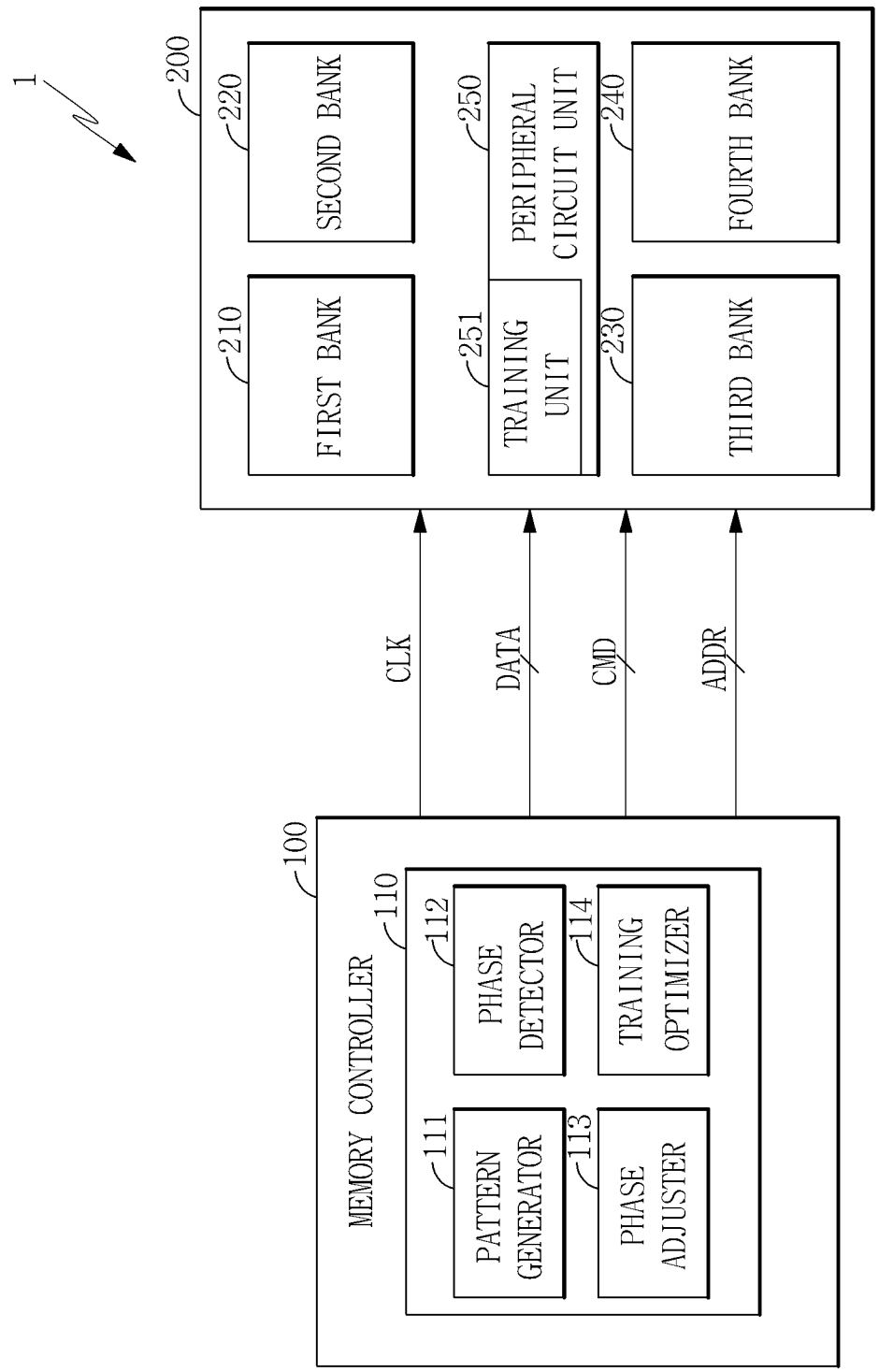
FIG. 1 is a diagram of an exemplary system including a memory device according to certain embodiments.

Various embodiments will now be described more fully with reference to the accompanying drawings in which some exemplary embodiments are shown. These examples may, however, be embodied in different forms and should not be construed as limited to the embodiments set forth herein. In the drawings, the sizes and relative sizes of regions may be exaggerated for clarity.

It will be understood that when an element is referred to as being "on," "connected to" or "coupled to" another element, it can be directly on, connected or coupled to the other element, or intervening elements may be present. In contrast, when an element is referred to as being "directly on," "directly connected to" or "directly coupled to" another element, there are no intervening elements present. Like numerals refer to like elements throughout. As used herein, the term "and/or" includes any and all combinations of one or more of the associated listed items.

It will be understood that, although the terms first, second, third, etc. may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the teachings of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram of an exemplary system including memory devices according to certain embodiments. For simplicity, FIG. 1 illustrates only a memory controller 100 and a memory device 200, which correspond to a portion of the system 1. Other elements (not shown) may be included in the system 1.

The memory controller 100 may apply a clock signal CLK to the memory device 200 to be synchronous with the memory device 200. Also, the memory controller 100 may apply a command CMD for controlling the memory device 200 to the memory device 200. When the applied command CMD is a read command or write command, an address ADDR for selecting a specific memory cell may be applied to the memory device 200 along with the command CMD. Furthermore, when the applied command CMD is a write command, the memory controller 100 may further apply data DATA to be stored in a selected memory cell of the memory device 200. Also, the memory controller 100 may include a training controller 110 configured to control the memory device 200 and a data training operation.

The training controller 110 may include a pattern generator 111 configured to generate training data PRBS for data training, a phase detector 112 configured to measure a skew between a clock signal CLK and data, and a phase adjuster 113 configured to adjust the phase of the training data PRBS according to the measured skew and compensate a skew between the clock signal CLK and the training data PRBS. The training controller 110 may further include a training optimizer 114 configured to store and analyze a noise profile as a result of data training according to one or more enabling states of a group of memory banks. The memory banks may comprise, for example, a memory array, or a portion of a memory array.

The memory device 200 may include a plurality of memory banks including the group of banks 210 to 240, each of which includes a plurality of memory cells (not shown) to store data, and a peripheral circuit unit 250 configured to control the group of banks 210 to 240 in response to a command CMD applied from the memory controller 100. The peripheral circuit unit 250 may include a training unit 251 configured to perform a series of data training operations in correspondence to the training controller 110 of the memory controller 100. As used herein, a "data training operation" refers to one or more steps used to assess a skew between a clock signal and data signal, or to assess another characteristic of a memory device or module. For example, a data training operation may include transmitting a training data pattern to the training unit 251, comparing it to a predetermined pattern, and determining a skew between a clock signal and the data based on the comparison. A "data training procedure," as used herein, refers to a set of operations used for data training, and may include one or more data training operations. The training unit 251 may include a training register (not shown) configured to store training data PRBS applied from the memory controller 100. Also, the training unit 251 may detect an edge of the training data PRBS in response to a clock signal CLK and store edge information edge info in a training register.

As described above, a conventional data training method may include storing training data PRBS in the training unit 251 of the memory device 200 and transmitting the training data PRBS stored in the training unit 251 during data training. Thus, since the training data PRBS is stored not in the group of banks 210 to 240 but in the training unit 251, it may be unnecessary to enable the banks 210 to 240 for data training. In other words, one or more data training operations may be performed during disabling of the group of banks 210 to 240. Thus, the data training may not reflect the influence of a core noise of the memory device 200.

The core noise of the memory device 200 may occur due to operation of the memory device 200, and may depend on the enabling state of the group of banks. That is, the group of banks may have a plurality of enabling states, wherein each enabling state is different, and for each enabling state a set of the memory banks of the group is enabled and the remaining of the memory banks of the group are not enabled.

In the memory device 200, a data window caused by the core noise, which depends on the enabling state of the group of banks, may have a variation of about 20 to 50 ps. Table 1 shows a data UI relative to the operating speed of a memory device.

TABLE 1

| OPERATING SPEED OF MEMORY DEVICE | DATA UNIT INTERVAL (UI) |
| --- | --- |
| 1.0 Gbps | 1 ns |
| 5.0 Gbps | 200 ps |
| 8.0 Gbps | 125 ps |
| 10.0 Gbps | 100 ps |
| 12.5 Gbps | 80 ps |

As shown in Table 1, in a memory device that operates in a frequency band of about 5 Gbps or less, even if a skew is adjusted by performing data training without consideration of a core noise, since a data UI is sufficiently large, a variation in a data window due to the core noise as contrasted with the entire data window may be very small and immaterial. In other words, a conventional memory device operating at speeds up to approximately 5 Gbps may perform data training without consideration of the variation in the data window due to the core noise. However, when a memory device operates in a frequency band of about 8 Gbps or more, a variation in a data window due to a core noise may become relatively high and influential so that the core noise cannot be ignored. As shown in Table 1, a memory device capable of operating at a frequency of 10 Gbps has a UI of 100 ps. Assuming that a variation in a data window due to a core noise is 20 ps, the UI of the memory device may vary within the range of 80 to 120 ps. When the operating speed of the memory device is calculated again based on the variation of the UI due to the core noise, the operation may vary between a frequency of about 12.5 Gbps with the UI of 80 ps, and about 8.4 Gbps with the UI of about 120 ps. As such, the operating speed of the memory device may be greatly varied, as much as 50% according to the core noise. Therefore, data training may benefit from optimization by considering a core noise that depends on the enabling state of the group of banks.

Hereinafter, for simplicity, read data training operations using byte data training will be described as an example of a data training method according to certain embodiments. However, the data training method according to the embodiments disclosed herein may be applied to a per-pin data training and write data training operations as well.

A pattern generator 111 of a memory controller 100 may generate training data PRBS during an initialization operation of the memory device 200 and apply the training data PRBS to a training unit 251 of the memory device 200. The training unit 251 of the memory device 200 may store the applied training data PRBS in a training register (not shown). Thereafter, to generate a noise profile, the memory controller 100 may enable different banks of a group of banks of the memory device 200 in different combinations and apply a command CMD and an address ADDR required for performing a first data training procedure that includes a series of first data training operations, one data training operation for each enabling state of the group of banks. For example, in one embodiment, for each data training operation of the series of first data training operations, the memory controller 100 may apply a command CMD to the memory device 200 for performing the data training operation, and may simultaneously, enable a set of banks of a group of banks, while disabling the remaining banks of the group of banks (e.g., by applying an appropriate bank address or set of bank addresses for enabling the bank(s)). For each data training operation of the series of first data training operations, the memory controller 100 may store each data training result in the training optimizer 114. The data training result may include, for example, a skew detected between a clock signal and a data signal resulting from the enabling state tested during the data training operation. Subsequently, the memory controller may statistically analyze the data training results for the respective plurality of bank enabling states and select a bank enabling state for optimizing further data training based on the analyzed result. Thereafter, the memory controller 100 may perform a second, optimized data training procedure that may include one or more second data training operations using the selected bank enabling state so that the memory device 200 can perform optimal data training that accounts for the noise resulting from different enabling states of the group of memory banks. In other words, in one embodiment, the first data training procedure including the series of first data training operations is a data training optimization procedure performed to determine an optimized data training enabling state to use during the second data training procedure, while the second, optimized data training procedure includes data training performed on data for the memory device 200, using the determined enabling state, to determine a skew that should be compensated for.

FIGS. 2A through 2D are diagrams showing exemplary enabling states for a group of banks of a memory device for optimizing data training, according to certain embodiments.

When the memory device 200 includes a group of four banks 210 to 240, the memory controller 100 may sequentially enable each the four banks 210 to 240 to perform a series of four first data training operations. FIGS. 2A through 2D illustrate a method of performing the first data training operations by sequentially enabling a plurality of banks.

A method of optimizing data training of a memory device 200 will now be described with reference to FIGS. 1 and 2A through 2D, according to one embodiment. Initially, the memory controller 100 applies training data PRBS during an initialization operation of the memory device 200 and stores the training data PRBS in the training unit 251 of the memory device 200. Thereafter, the memory controller 100 applies an address for enabling only the first bank 210 (a first enabling state for the group of banks) and a data training command CMD to the memory device 200. The memory device 200 enables the first bank 210 in response to the applied address and outputs the stored training data PRBS to the memory controller 100 in response to the data training command CMD.

The training controller 110 of the memory controller 100 receives the training data PRBS from the memory device 200, and a phase detector 112 of the training controller 100 detects a skew between a clock signal CLK and the applied training data PRBS. In one embodiment, data training includes a method of adjusting the phase of data such that a rising or falling edge of the clock signal CLK is positioned in the center of a data window. Therefore a skew between the clock signal CLK and the applied training data PRBS may be obtained by detecting a rising or falling edge of the clock signal CLK and the center of the data window of the training data PRBS. The training optimizer 114 may store the skew detected by the phase detector 112.

Figure 2A:
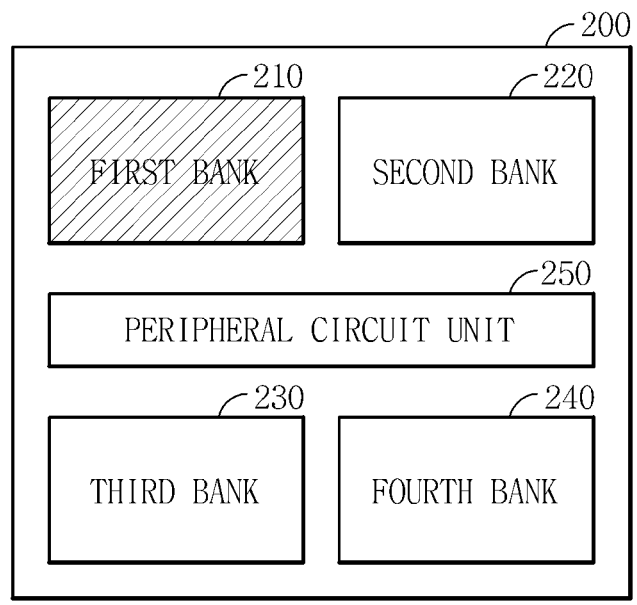
FIGS. 2A through 2D are diagrams showing exemplary enabling states of a group of banks of a memory device for optimizing data training, according to certain embodiments.
Figure 2B:
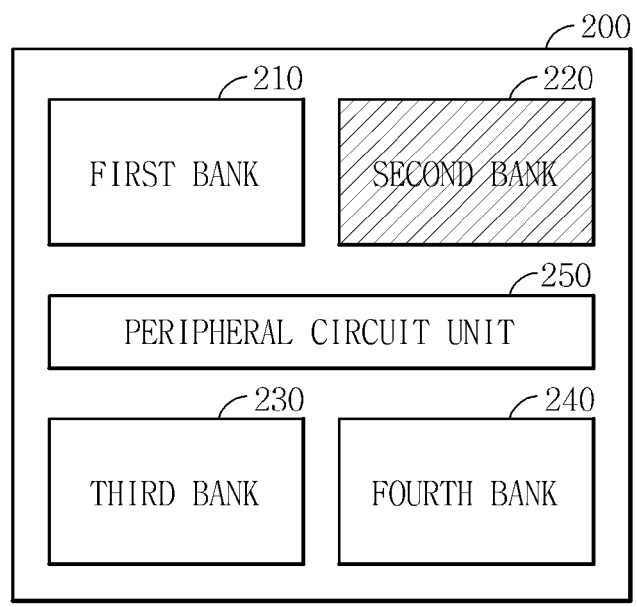
Figure 2C:
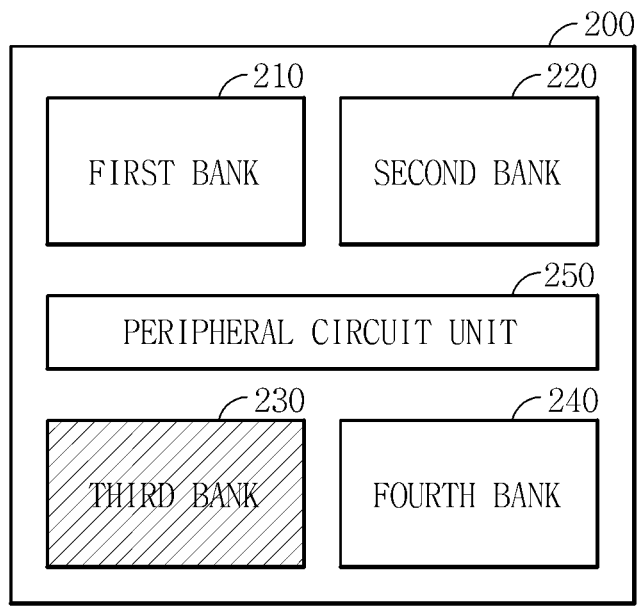
Figure 2D:
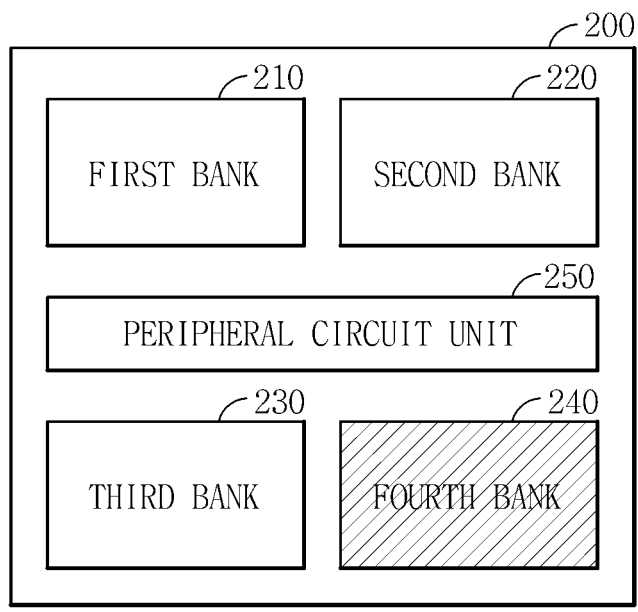

As shown in FIG. 2B, the memory controller 100 next applies an address for enabling only the second bank 220 (a second enabling state for the group of banks) and a data training command CMD to the memory device 200, performs a data training operation for the memory device 200 in the second enabling state, detects a skew between a clock signal CLK and training data PRBS, and stores the skew in the training optimizer 114. Similarly, as shown in FIGS. 2C and 2D, the memory controller 100 may enable third and fourth banks 230 and 240, perform a data training operation, detect a skew between the clock signal CLK and training data PRBS, and store the skew in the training optimizer 114. In other words, the memory controller 100 may generate and store a noise profile.

When all the respective banks 210 to 240 of the memory device 200 have been enabled (i.e., all four enabling states for the group of banks 210 to 240 have been used for training), and information on a skew between the clock signal CLK and the training data PRBS according to each enabling state is stored in the training optimizer 114, the memory controller 100 may select one of the enabling states as an optimal state to use in an optimized data training procedure for the memory device 200, based on the stored information on the skew. For example, in one embodiment, it may be assumed that when the first bank 210 is enabled, a skew between the clock signal CLK and the training data PRBS is −10 ps, and when the second through fourth banks are enabled, skews between the clock signal CLK and the training data PRBS are 5 ps, 7 ps, and −5 ps, respectively. In this case, the skew between the clock signal CLK and the data training PRBS may range from −10 to 7 ps. An intermediate value of the skew may be selected that is at a midpoint between the maximum skew and minimum skew (i.e., −1.5 ps).

TABLE 2

| Enabling states of the group of banks | | | | Skew |
|---|---|---|---|---|
| 1 | 0 | 0 | 0 | −10 ps |
| 0 | 1 | 0 | 0 | 5 ps |
| 0 | 0 | 1 | 0 | 7 ps |
| 0 | 0 | 0 | 1 | −5 ps |

Table 2 shows an example of a noise profile. As shown in Table 2, the noise profile may include enabling states of the group of banks and a skew between a clock signal CLK and training data PRBS as a result of the series of first data training operations.

In one embodiment, the memory controller 100 may determine an enabling state causing the closest skew to an intermediate skew and select the determined enabling state as a reference enabling state. For example, in the example above, the memory controller 100 may select the enabling state where only the fourth bank 240 is enabled, which state causes the closest skew to an intermediate skew value of −1.5 ps, midway between the maximum skew of 7 ps and minimum skew of −10 ps, as the reference enabling state. Thereafter, memory controller 100 may always enable the fourth bank when performing further data training operations (i.e., optimized data training operations). As a result, regardless of which banks are enabled by the memory device 200 to perform an operation, the memory controller 100 should be capable of receiving and transmitting data from and to the memory device 200 without errors. When the memory controller 100 selects the largest or smallest skew other than the intermediate skew as the reference skew, data may be erroneously transmitted during the enabling of some banks of the memory device 200. Even if an average skew is selected as the reference skew, some data may be erroneously transmitted. Accordingly, in one embodiment, the memory controller 100 selects an intermediate midpoint value of the skew between the highest and lowest enabling state skew values as the reference skew to provide for optimized data training.

The memory controller 100 may then select the enabling state for the group of banks that results in the closest skew to the intermediate midpoint value selected as the reference value as a reference enabling state in order to result in an optimized data training procedure.

FIGS. 2A through 2D illustrate that the memory device 200 includes four banks, and four enabling states for the group of banks. However, selecting between these four enabling states may not result in the most optimized enabling state possible for optimized data training. Therefore, other enabling states can be used to optimize data training, as discussed further below.

Also, although it is described that the memory controller 100 selects an intermediate midpoint skew of the clock signal CLK and the training data PRBS as the reference value, the memory controller 100 may select any other statistical value as the reference value according to the purposes or characteristics of the memory device 200.

FIGS. 3A through 3D are diagrams showing exemplary enabling states of banks of a memory device for optimizing data training, according to other embodiments.

Figure 3A:
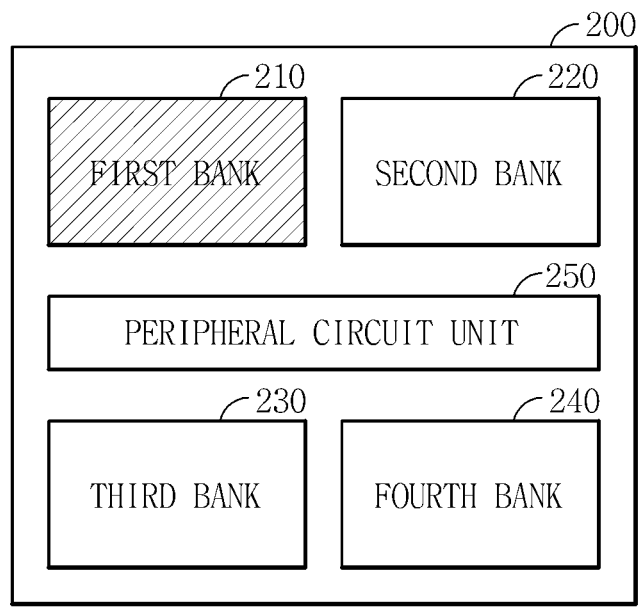
FIGS. 3A through 3D are diagrams showing exemplary enabling states of a group of banks of a memory device for optimizing data training, according to additional embodiments.
Figure 3B:
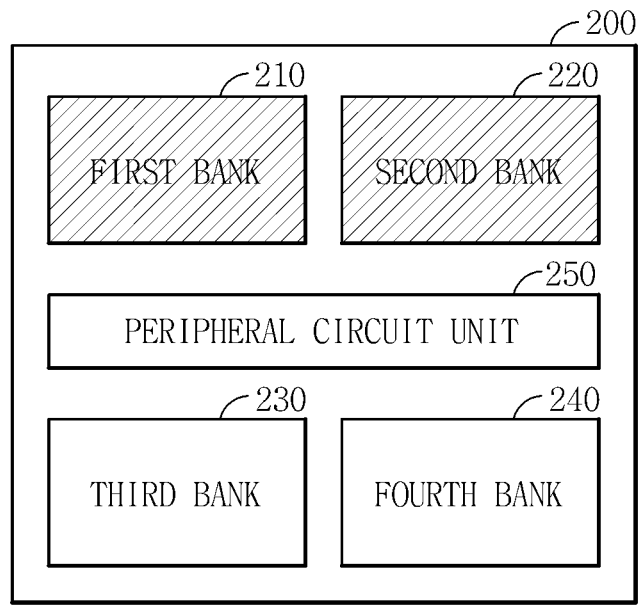
Figure 3C:
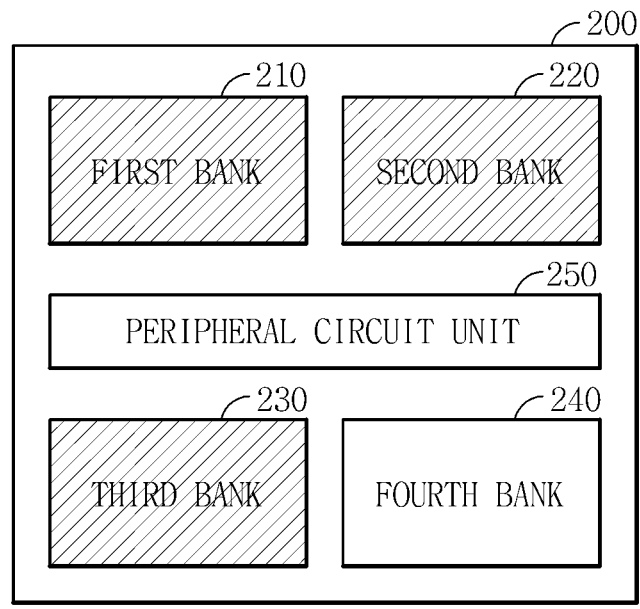
Figure 3D:
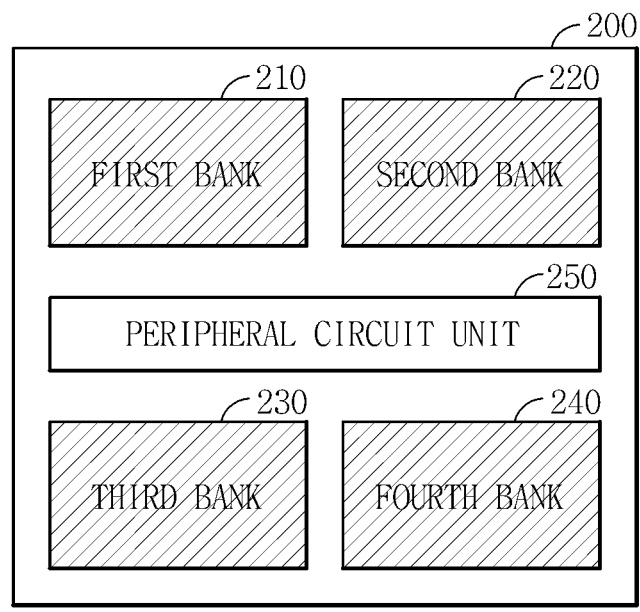
Figure 4A:
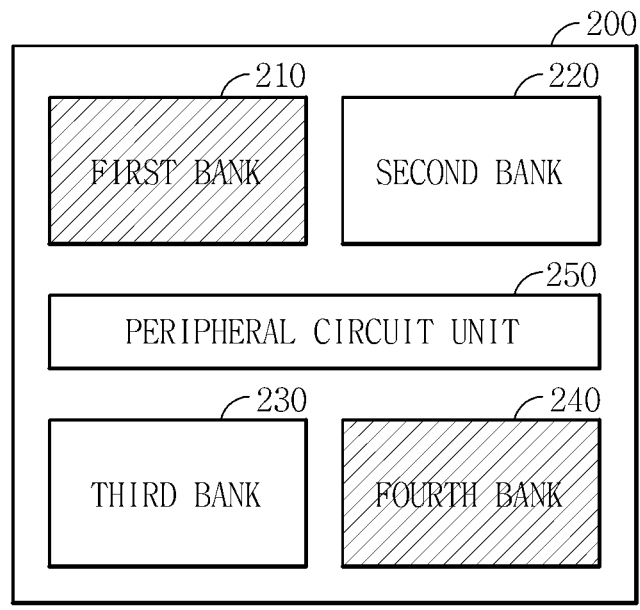
FIGS. 4A through 4D are exemplary diagrams showing enabling states of a group of banks of a memory device for optimizing data training, according to still other embodiments.
Figure 4B:
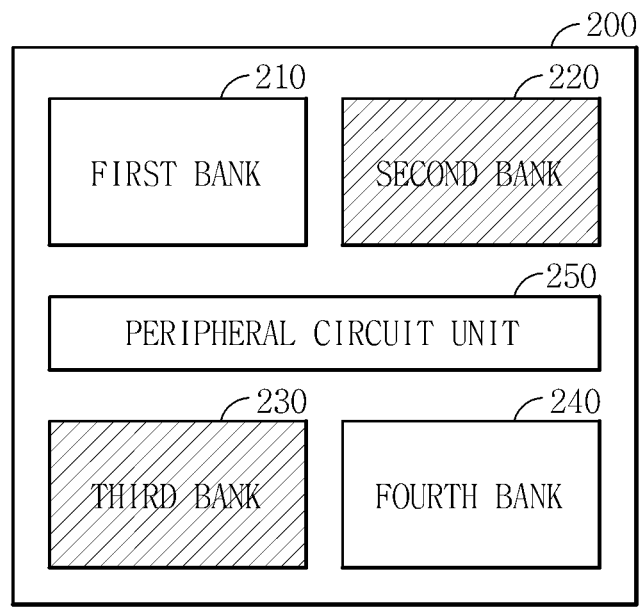
Figure 4C:
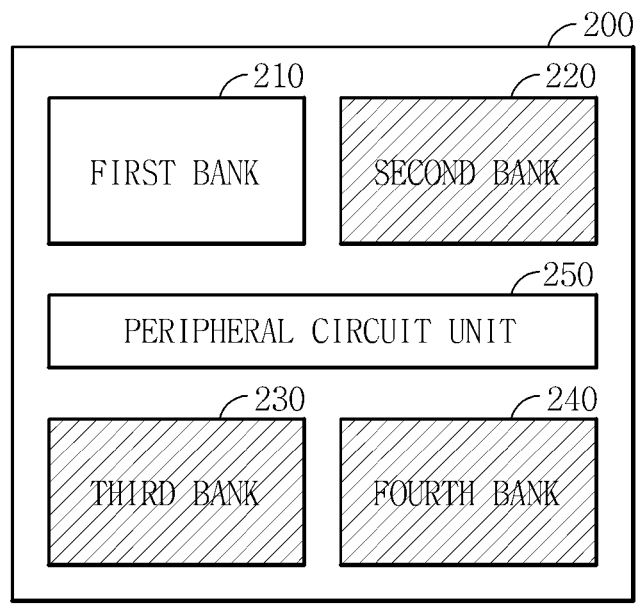
Figure 4D:
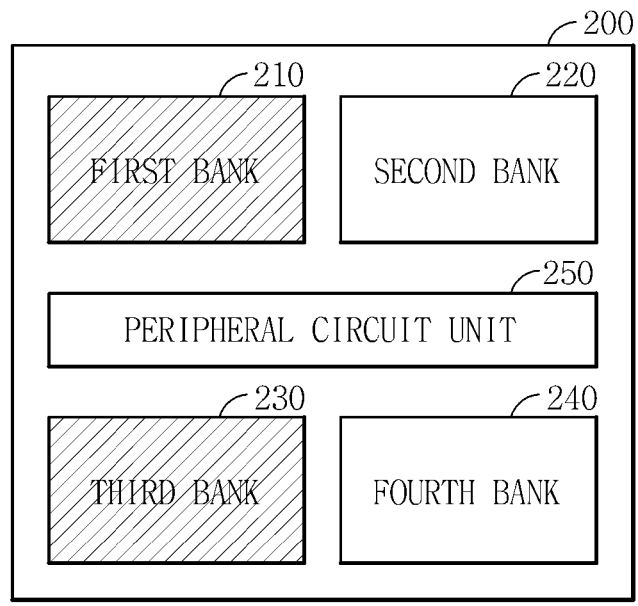

FIGS. 3A through 3D illustrate a method of optimizing data training based on different arrangements of enabling states for a group of banks 210 to 240. In FIGS. 2A through 2D, in each of the group enabling states for the four banks 210 to 240, only one bank is enabled at a time to generate a noise profile. However, enabling states for a group of memory banks may be selected such that for some enabling states, a plurality of banks of the memory device 200 are enabled at the same time. Accordingly, to optimize data training, a noise profile may be generated where enabling states are chosen so that a plurality of banks are enabled at the same time. Thus, FIG. 3A illustrates an enabling state where only the first bank 210 is enabled to perform a data training optimization operation like in FIG. 2A. In comparison, FIG. 3B illustrates that the first and second banks 210 and 220 are enabled to perform a data training optimization operation, FIG. 3C illustrates that the first through third banks 210 to 230 are enabled to perform a data training optimization operation, and FIG. 3D illustrates that all the first through fourth banks 210 to 240 are enabled to perform a data training optimization operation. In other words, in FIGS. 3B through 3D, a plurality of banks may be overlapped and enabled for different enabling states and the sequence of first data training operations may be performed according to the enabling states so that a skew between the clock signal CLK and the training data PRBS can be measured to generate a noise profile. Thereafter, the memory controller 100 may select an enabling state of the group of banks based on the generated noise profile to use in an optimized data training procedure, and may enable banks based on the selected enabling state during the optimized data training procedure. Although not shown, when a plurality of banks are overlapped to generate a noise profile, one enabling state may include the memory controller 100 disabling all the banks to perform one of the data training optimization operations and measure the skew between the clock signal CLK and the training data PRBS to generate the noise profile.

FIGS. 4A through 4D are diagrams showing exemplary enabling states of a group of banks of a memory device for optimizing data training, according to other embodiments.

As shown in FIGS. 4A through 4D, the memory controller 100 may enable a plurality of banks 210 to 240 of a memory device 200 in various combinations to form a number of enabling states for the group of memory banks. For each enabling state, the memory controller 100 may perform a first data training operation. The memory controller 100 can then generate a noise profile. As shown in FIGS. 4A through 4D, assuming that the memory device 200 includes four banks 210 to 240, the number of possible combinations of enabling states of the group of banks may be $2^4(=16)$, and a skew between a clock signal CLK and training data PRBS corresponding to each of the combinations may be measured to generate a noise profile. Thereafter, as in the previous embodiments, the memory controller 100 may select an enabling state of the group of banks to use for performing an optimized data training procedure based on the noise profile, and may appropriately apply that enabling state during an optimized data training procedure for the memory device 200.

As described above, a system 1 including a memory device 200 according to certain embodiments may enable a plurality of banks of the memory device 200 in various combinations, perform a series of first data training operations for the respective combinations, and measure a skew between a clock signal CLK and training data PRBS for each combination to generate a noise profile. Thereafter, the system 1 may perform an optimized data training procedure based on a statistical value of the generated noise profile.

Figure 5:
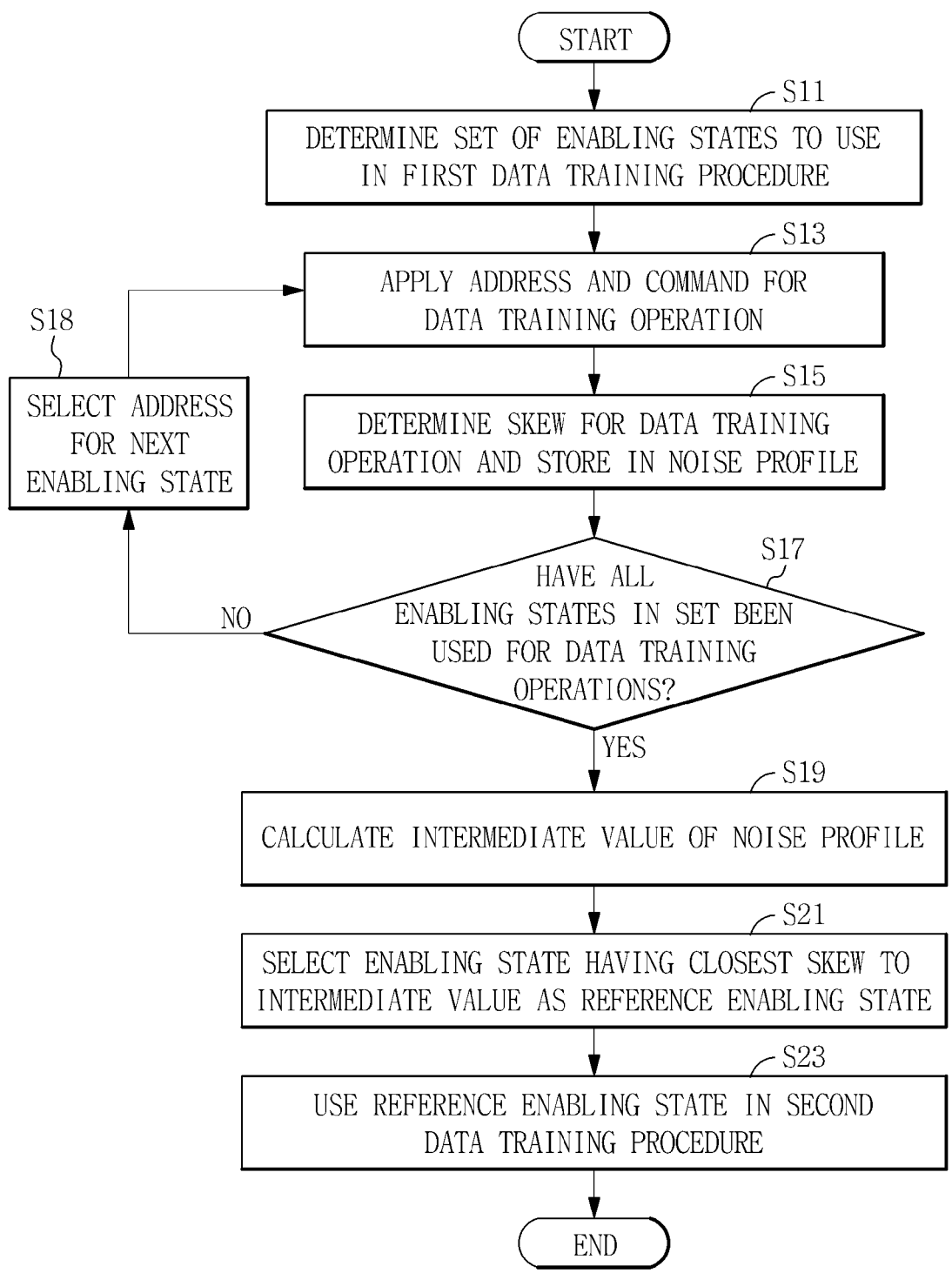
FIG. 5 is a flowchart illustrating an exemplary method of optimizing data training in a system including memory devices according to certain disclosed embodiments.

FIG. 5 is a flowchart illustrating an exemplary method of optimizing data training in a system including memory devices according to certain embodiments.

The data training optimization method will now be described with reference to FIGS. 1 through 4. In operation S11, a memory controller 100 may determine a set of enabling states for a group of banks 210 to 240 of a memory device 200. These will be used for a first data training procedure (e.g., including a series of first data training operations such as described above) to be performed on the memory device 200. The set of enabling states may be a set such as shown in FIGS. 2A through 2D, or as shown in FIGS. 3A through 3D, or as shown in FIGS. 4A through 4D. Alternatively, the set of enable states may be any set including up to $2^n$ states, where n is the number of banks (e.g., 4). The set of the enabling states to be used for data training of the banks 210 to 240 may be previously determined and stored in the training controller 110 of the memory controller 100.

When the set of the enabling states of the banks 210 to 240 is determined, the memory controller 100 may apply an address for an enabling state and a command CMD for performing a first data training operation to the memory device 200, and may thus perform a data training operation according to a first enabling state in operation S13. The memory device 200 may enable one or more banks according to the first enabling state, and may then output first training data PRBS to the memory controller 100 in response to the applied command CMD. In operation S15, the memory controller 100 may compare the phase of the first training data PRBS applied from the memory device 200 with an edge of a clock signal CLK and store a record of the skew between the first training data PRBS and the clock signal CLK in a noise profile.

In operation S17, the memory controller 100 may determine whether or not skews corresponding to all of the determined enabling states have been used in the first data training procedure, and have been stored in the noise profile. When the skews corresponding to each of the enabling states of the set are not yet stored in the noise profile, an address and a command CMD corresponding to additional enabling states that have not yet been applied to the memory device 200 may be applied to the memory device 200 in operation S13 and stored in the noise profile in operation S15. However, when the skews corresponding to all of the enabling states of the set have been determined and stored in the noise profile, the training controller 110 of the memory controller 100 may calculate an intermediate value of the generated noise profile in operation S19 (e.g., a midpoint skew value between the highest and lowest skews stored in the noise profile).

In operation S21, the training controller 110 may determine and select as a reference enabling state, an enabling state having the closest skew to the calculated intermediate value. In operation S23, the training controller 110 may use the reference enabling state in a second data training procedure (e.g., an optimized data training procedure for performing data training operations using the reference enabling state). As such, an optimized enabling state, such as the one that causes a skew closest to the intermediate skew, can be selected as the reference enabling state to allow optimized data training.

The above-described data training optimization may involve performing a series of first data training optimization operations to generate the noise profile. Thus, since these data training operations may take a larger amount of time than the subsequent optimized data training procedure, the series of first data training optimization operations may be performed during an initialization operation for the memory device 200 in which there is relatively sufficient time to spare. Alternatively, the data training optimization operations may be performed in a self-refresh mode in which the memory device 200 neither receives nor transmits data.

In one embodiment, the memory controller 100 and the memory device 200, which transmit data DATA at high speeds, may include an error detection circuit configured to determine whether or not the transmitted data DATA includes errors. When the memory controller 100 or the memory device 200 includes the error detection circuit, the error detection circuit may determine whether the data DATA transmitted between the memory controller 100 and the memory device 200 includes errors.

It is described above that training data PRBS is stored in the training unit 251 of the memory device 200. However, the training data PRBS may be stored in a plurality of banks 210 to 240. During a practical operation of the memory device 200, the memory device 200 stores data in the banks 210 to 240 instead of the training unit 251. Accordingly, when the training data PRBS is stored in the training unit 251 and a first or second data training operation is performed using the stored training data PRBS, the first or second data training operation cannot precisely reflect an actual operation of the memory device 200. Thus, one bank may be selected from the plurality of banks, and the training data PRBS may be stored in the selected bank to perform the first or second data training procedures. Furthermore, since the banks may be enabled in various combinations, some at the same time during data training, the training data PRBS may be stored in each of a plurality of enabled banks to perform the first or second data training procedures.

It is described that the memory device 200 enables a plurality of banks 210 to 240 in different combinations to generate a noise profile and optimize a subsequent data training operation or procedure based on the generated noise profile. However, the optimization operations described herein may be applied in a broader context, such that when the system 1 includes a plurality of memory devices or a plurality of modules, the memory controller 100 may enable the plurality of memory devices or the plurality of modules in different combinations to generate a noise profile. As such, a method of optimizing data training according to the disclosed embodiments may be applied likewise not only to a plurality of memory banks but also to a plurality of memory devices (e.g., memory chips, chip packages, or package-on-package devices) or a plurality of memory modules. As used herein, the terms "memory bank," "memory chip," "chip package," "package-on-package device," and "memory module" may each be referred to generally as a "memory unit" or "storage device." In addition, the embodiments disclosed herein could be used in various types of memory systems, such as DRAM, SRAM, NAND or NOR flash, or other memory types.

It is described that a generated noise profile may be used for the second, optimized data training procedure. However, the noise profile may also be used to precisely adjust a time point when data is transmitted between the memory controller 100 and the memory device 200. That is, when an actual memory device operates, data training may be previously performed so that data can be transmitted at a precise time point. In this aspect, the memory controller 100 may store a noise profile that indicates a skew between a clock signal CLK and data DATA corresponding to every possible enabling state of a group of memory banks. Accordingly, the memory controller 100 may compensate the skew between the clock signal CLK and the data DATA for any given enabling state based on the skew corresponding to that state and stored in a noise profile. That is, the memory controller 100 may adjust the skew between the clock signal CLK and the data DATA differently according to each enabling state not only during a data training procedure, but also during a normal read or write operation. As such, the memory controller 100 may perform a read or write operation for a first enabling state of a first memory device 200 by using a first skew stored during a series of first data training operations that corresponds to the first enabling state, may perform a read or write operation for a second enabling state of the first memory device 200 by using a second skew stored during the series of first data training operations that corresponds to the second enabling state, etc.

Although a read data training operation of a byte data training operation is exemplarily particularly explained above, embodiments of the inventive concept may be applied to a per-pin data training operation and a write data training operation.

As described above, a method of optimizing data training in a system including a plurality of memory devices according to embodiments of the inventive concept may include enabling a group of memory units in a plurality of enabling states and performing data training according to each of the enabling states to generate a noise profile corresponding to each of the enabling states. Thereafter, the generated noise profile may be analyzed to select an enabling state for optimizing data training. Subsequently, data training may be performed in the selected enabling state to optimize data training of a storage device that includes the memory units. Furthermore, data training may be performed by storing data required for data training in at least one of the memory units so that the accuracy of the data training can be further increased. As a result, the operating speed and reliability of the system including the storage device may be improved.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A method of performing data training in a system including a memory controller and at least a first memory device including a group of memory banks, the method comprising:
providing a plurality of enabling states for the group of memory banks, wherein each enabling state is different and for each enabling state a set of the memory banks of the group is enabled and any remaining of the memory banks of the group are not enabled;
performing a first data training procedure that includes a series of first data training operations for the first memory device, each data training operation being performed for a different one of the plurality of enabling states;
generating a noise profile based on the series of first data training operations;
statistically analyzing the noise profile to select a reference enabling state of the group of memory banks; and
performing a second data training procedure for the first memory device using the reference enabling state.

2. The method of claim 1, wherein:
each operation of the series of first data training operations includes determining a skew between a clock signal and training data; and
generating the noise profile includes storing the determined skew from each operation of the series of first data training operations.

3. The method of claim 2, wherein:
the group of memory banks includes n banks, n being at least 2;
the plurality of enabling states includes between 4 and $2^n$ states; and
statistically analyzing the noise profile includes determining a reference value based on the noise profile.

4. The method of claim 3, wherein:
the reference value is an intermediate value between a greatest determined skew and a smallest determined skew stored in the noise profile; and
the reference enabling state is an enabling state that has a skew closest to the intermediate skew.

5. The method of claim 4, wherein:
the intermediate value is a mid-point between the greatest determined skew and the smallest determined skew stored in the noise profile.

6. The method of claim 2, wherein:
the first memory device comprises a training register configured to receive the training data from the memory controller and store the training data.

7. The method of claim 2, wherein:
the first memory device receives the training data from the memory controller and stores the training data in at least one of the plurality of memory banks.

8. The method of claim 1, wherein:
the plurality of enabling states includes a set of at least four states; and
for the set of at least four states, each memory bank is enabled at least once.

9. The method of claim 1, wherein:
the method is performed during an initialization operation of the first memory device.

10. A system, comprising:
at least a first memory device including a group of memory units; and
a memory controller including a training controller configured to:
provide a plurality of enabling states for the group of memory units, wherein each enabling state is different and for each enabling state a set of the memory units of the group is enabled and any remaining of the memory units of the group are not enabled;
perform a first data training procedure including a series of first data training operations for the first memory device, each data training operation being performed for a different one of the plurality of enabling states;
generate a noise profile based on the series of first data training operations;
statistically analyze the noise profile to select a reference enabling state of the group of memory units; and
perform a second data training procedure for the first memory device using the reference enabling state.

11. The system of claim 10, further comprising:
a pattern generator configured to generate training data;
a phase detector configured to detect a skew between a clock signal and the training data during the series of first training operations and during the second data training procedure;
a training optimizer configured to generate and analyze the noise profile during the first data training procedure; and
a phase adjuster configured to adjust the skew between the clock signal and the training data during the second data training procedure.

12. The system of claim 11, wherein:
the group of memory units includes n units, n being at least 2;
the plurality of enabling states includes between 4 and $2^n$ states;
each operation of the series of first data training operations includes determining a skew between a clock signal and training data; and
generating the noise profile includes storing the determined skew from each operation of the series of first data training operations;
statistically analyzing the noise profile includes determining a reference value based on the noise profile; and
the reference value is an intermediate value between a greatest determined skew and a smallest determined skew stored in the noise profile.

13. The system of claim 10, wherein:
the group of memory units is one of: a group of memory banks, a group of memory chips, a group of chip packages, or a group of package-on-package devices.

14. A method of performing data training in a system including a memory controller and at least a first memory device including a plurality of memory banks, the method comprising:

providing a plurality of enabling states for the plurality of memory banks, wherein each enabling state is different and for each enabling state a set of the plurality of memory banks is enabled and any remaining of the memory banks are not enabled;
performing a first data training procedure that includes a series of first data training operations for the first memory device, each data training operation being performed for a different one of the plurality of enabling states;
generating a noise profile based on the series of first data training operations;
using the noise profile to compensate for skew in the first memory device;
statistically analyzing the noise profile to select a reference enabling state of the plurality of memory banks; and
performing a second data training procedure for the first memory device using the reference enabling state derived from the noise profile,
wherein using the noise profile to compensate for skew in the first memory device includes performing a second data training procedure that includes one or more second data training operations, in order to compensate for skew determined during the first data training procedure.

15. The method of claim 14, wherein:
each operation of the series of first data training operations includes determining a skew between a clock signal and training data;
generating the noise profile includes storing the determined skew from each operation of the series of first data training operations; and
statistically analyzing the noise profile includes determining a reference value based on the noise profile, wherein the reference value is an intermediate value between a greatest determined skew and a smallest determined skew stored in the noise profile.

16. The method of claim 14, wherein:
generating the noise profile based on the series of first data training operations includes:
for each operation of the series of first data training operations, determining a skew between a clock signal and training data, and
storing the determined skew from each operation of the series of first data training operations, each stored skew corresponding to a respective enabling state of the plurality of memory banks; and
using the noise profile to compensate for skew in the first memory device includes:
performing a read or write operation for a first enabling state of the first memory device by compensating for a first skew stored during the first series of data training operations that corresponds to the first enabling state, and
performing a read or write operation for a second enabling state of the first memory device by compensating for a second skew stored during the first series of data training operations that corresponds to the second enabling state.

* * * * *